United States Patent Office 3,544,541
Patented Dec. 1, 1970

3,544,541
VULCANIZABLE COMPOSITIONS CONTAINING AZIRIDINYL COMPOUND AND BASIC COMPOUND
Douglas C. Edwards and Premysl Thomas Dolezal, Sarnia, Ontario, Canada, assignors to Polymer Corporation Limited, Sarnia, Ontario, Canada, a body corporate and body politic
No Drawing. Filed Mar. 18, 1968, Ser. No. 714,017
Claims priority, application Canada, Apr. 14, 1967, 987,841
Int. Cl. C08d 5/02, 5/04; C08f 27/08
U.S. Cl. 260—94.7                                  8 Claims

ABSTRACT OF THE DISCLOSURE

A liquid polymer containing molecules with more than one active halogen atom, preferably allylic halogen, is mixed with an aziridinyl compound and a minor amount of an additive selected from inorganic basic substances or metal compounds of metals such as copper, iron, nickel and cobalt, or mixtures of both. The resulting mixture is storable at room temperature and can be vulcanized at temperatures of at least 50° C. to a substantially insoluble vulcanized composition.

The above mixture is suitable for use as a binder for particulate solid material e.g. for solid rocket propellant compositions.

This invention relates to liquid polymers of olefinically unsaturated hydrocarbon monomers and particularly to the vulcanization of these polymers.

In this specification, liquid polymers are defined broadly as pourable polymers; such polymers are non-volatile and generally have intrinsic viscosities of not more than about 1.0 dl./g. in toluene at 30° C., and vulcanizates are the solid reaction products of the liquid polymer with compounds which are capable of linking molecules of the liquid polymers.

Previously, liquid polymers of $C_4$–$C_8$ diolefins, containing allylic halogen groups have been mixed with multifunctional amines and vulcanized therewith as has been described in French Pat. 1,488,811. However, such mixtures have the disadvantage that they vulcanize at low to moderate temperatures, such as room temperature, which limits their use in certain applications. Also, when the liquid polymer is used as a rocket propellant binder, highly basic amines in many cases should not be present; such amines are regarded as unsafe when used in the presence of unstable oxidizing substances such as ammonium perchlorate. It is therefore highly desirable to develop curing systems for the liquid polymer which may be used safely in the presence of ammonium perchlorate, which do not cause vulcanization at room temperature within a few hours and which impart a satisfactory rate of cure at higher temperatures.

It has been found that the liquid polymers containing allylic halide groups such as are described in French Pat. 1,488,811, can be mixed at low temperatures with compounds containing one or more aziridiryl groups in the presence of inorganic basic substances or metal compounds of metals such as copper, iron, nickel and cobalt, to produce homogeneous compositions. These compositions are stable for sufficiently long periods of time at room temperature so that they can be poured into forms or otherwise shaped and then vulcanized at higher temperatures.

The composition of this invention is provided by a mixture comprised of (a) a major amount of a liquid polymer of an olefinically unsaturated compound, said polymer comprising polymeric molecules containing more than one active halogen atom, (b) a minor amount of a compound containing at least one aziridinyl group and (c) a minor amount of an inorganic basic substance, metal compound selected from compounds of copper, iron, and nickel and cobalt, or mixtures theerof.

The liquid polymer that is used in this invention is a nonvolatile material having a molecular weight above about 1000. Above this lower limit, the molecular weight may vary widely, although it is desirable that the polymer is liquid and pourable, preferably at room temperature, that is, that it has a bulk viscosity of not more than 5000 to 10,000 poise at 25° C. However, it is within the scope of this invention to use higher molecular weight polymer, the bulk viscosity of which has been reduced to the desired level with a compatible oil.

The liquid polymer is characterized by the presence of more than one active halogen per molecule in the majority of the molecules. The preferred active halogens are in the form of allylic halide groups having the formula

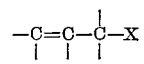

in which X is a halogen atom. The halogen atom may be selected from chlorine, bromine or iodine, although best results are obtained with liquid polymers having allylic brimide groups. It is preferred that the allylic halide groups are attached to the polymeric molecules in terminal positions, i.e. at the ends of linear chain molecules and, if the molecules are branched, at the end of branches. In other words, the preferred polymer contains molecules with two or more terminal allylic halide groups. However, the presence of allylic halide groups or other halogen groups in the middle portions of the chain molecules is not detrimental. The polymer may be prepared by a free radical polymerization of olefinically unsaturated compounds; it may be a homopolymer or a copolymer of two or more polymerizable compounds. Unsaturated hydrocarbons are the preferred compounds, although a small proportion of the polymerizable compounds may contain oxygen, nitrogen and/or chlorine atoms. The preferred liquid polymers used in this invention are polymers of diolefinic hydrocarbons containing 4 to 8 carbon atoms such as butadiene-1,3, isoprene, pentadiene-1,3, 2,3-dimethylpentadiene, and best results are obtained with polymers of butadiene-1,3 with or without a minor amount of copolymerized vinyl compounds such as styrene, acrylonitrile, alkyl acrylate and others. Depending on the molecular weight of the liquid polymer, number of the allylic halide groups and type of the halogen atom, the halogen content of the liquid polymer falls within the range of 1–15 weight percent and preferably within the range of 1.5–10 weight percent.

The liquid polymer suitable for use according to this invention may be prepared by various processes. One such process is a direct polymerization of monomers in the presence of halogen containing modifiers such as described in French Pat. 1,488,811. It is also possible to produce such liquid polymers by post-polymerization modification such as halogenation of unsaturated liquid polymers, oxidative halogenation of saturated liquid polymers or degradative halogenation of solid polymers, under conditions such that at least two active halogens, preferably allylic halogens, are produced in a polymeric molecule.

The aziridinyl group containing compound of this invention may have said group or groups attached to atoms of various elements such as carbon, phosphorus, nitrogen, etc. and said compound may be cyclic or acyclic. Those compounds containing 2 to 6 aziridinyl groups per molecule are preferred. The triaziridinyl phosphine oxides or sulfides are typical of compounds used in this type of curing reaction and these are represented by the formula:

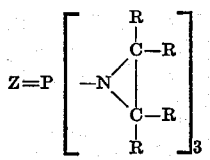

wherein Z is selected from the group consisting of oxygen and sulfur, and each R is a radical selected form the group consisting of hydrogen, alkyl, cycloalkyl and aryl radicals and the total R substituents of each aziridinyl group containing up to a total of 20 carbon atoms. Specific phosphine oxide and sulfide reactants which can be used include:

tri(2-methyl-1-aziridinyl)phosphine oxide,
tri(2-amyl-3-benzyl-1-aziridinyl)phosphine sulfide,
tri(2,2-dimethyl-1-aziridinyl)phosphine oxide,
tri[2-n-propyl-3-(2-phenylethyl)1-aziridinyl]phosphine oxide,
tri(2-methyl-3-cyclohexyl-1-aziridinyl)phosphine sulfide,
tri(2-eicosyl-1-aziridinyl)phosphine oxide,
tri(2-phenyl-1-aziridinyl)phosphine sulfide,
tri(2-phenyl-1-aziridinyl)phosphine oxide,
tri(1-aziridinyl)phosphine oxide, and
tri(2-methyl-1-aziridinyl)phosphine sulfide.

Examples of other polyfunctional aziridinyl compounds are the iziridinyl-substituted triazines and triphosphatriazines represented by the formulas:

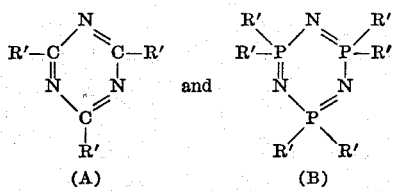

wherein each R' is a radical at least two of which in each formula are 1-aziridinyl radicals as defined above for the phosphine oxides and sulfides and the remainder is selected from the group consisting of said 1-aziridinyl radicals, hydrogen, alkyl, cycloalkyl and aryl radicals, each hydrocarbon radical containing from 1 to 12 carbon atoms.

Examples of compounds represented by Formula A include the following:

2,4,6-tri(1-aziridinyl)1,3,5-triazine,
2,4,6-tri(2-methyl-1-aziridinyl)1,3,5-triazine,
2,4,6-tri(2-n-propyl-3-(2-phenylethyl)1-aziridinyl) 1,3,5-triazine,
2,4,6-tri(2-phenyl-1-aziridinyl)1,3,5-triazine, and
2,4-di(1-aziridinyl)1,3,5-triazine.

Examples of compounds represented by Formula B are:

2,2,4,4,6,6-hexa(2-methyl-1-aziridinyl)2,4,6-triphospha-1,3,5-triazine,
2,4,6-tri(2-ethyl-3-cyclohexyl-1-aziridinyl)2,4,6-triphospha-1,3,5-triazine,
2,4,6-tri[2-n-propyl-3-(2-phenylethyl) 1-aziridinyl]2,4,6-triphospha-1,3,5-triazine, and
2,4-di(1-aziridinyl)2,4,6-triphopha-1,3,5-triazine.

Other difunctional aziridinyl compounds which can be employed are defined by the formula:

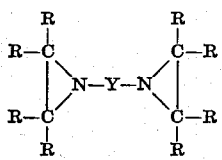

wherein Y is selected from the group consisting of carbonyl, phenyl phosphoryl, phenyl thiophosphoryl, sulfoxyl or sulfonyl and each R is as defined above for the aziridinyl radical of the phosphine oxides and sulfides. In a preferred species Y is phenyl phosphoryl or suloxyl attached to (2-methyl-1-aziridinyl) groups. Examples of these difunctional aziridinyl compounds are:

phenyl-bis(2-methyl-1-aziridinyl)phosphine oxide,
phenyl-bis(2-methyl-1-aziridinyl)phosphine sulfide,
bis(1,2-propylene)1,3-urea,
bis(2-propyl-1-aziridinyl)sulfoxide, and
bis(2-ethyl-1-aziridinyl)sulfone, and the like.

Compounds having two or more aziridinyl groups are particularly suitable as vulcanizing agents in obtaining vulcanizates with satisfactory physical properties.

The amount of aziridinyl compound used is minor to the amount of liquid polymer and is in the range of about 0.5 to 15 parts by weight of aziridinyl groups in the compound per 100 parts by weight of polymer and is preferably in the range of about 0.5 to 10 parts by weight.

The inorganic basic substance of this invention may be selected from a wide variety of inorganic compounds having basic properties such as metal oxides, hydroxides, carbonates, silicates, sulfates, phosphites and salts of organic acids. The metals include alkali metals, alkaline earth metals and lead. Examples of suitable substances include basic lead sulfate, magnesium oxide, calcium oxide, basic lead stearate, calcium hydroxide, basic lead silicate, lithium hydroxide, basic lead carbonate $$(2PbCO_3 \cdot Pb(OH)_2)$$

calcium silicate, basic lead phosphite, etc. The preferred inorganic substances are metal hydroxides such as LiOH, $Ca(OR)_2$, 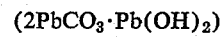 $2PbCO_3 \cdot Pb(OH)_2$, and magnesium oxide. The amount of inorganic basic substance used is minor to the amount of liquid polymer and is in the range of about 0.5 to 15 parts by weight per 100 parts by weight of liquid polymer and is preferably in the range of about 1–10 parts by weight.

The metal compound of this invention is selected from a wide variety of compounds of copper, iron, nickel and cobalt. For the purposes of this specification, the term "metal compound" is intended to cover compounds of metals in various valence states e.g. Fe (II) and Fe (III), Cu (II) and Cu (I), Ni (II) and Ni (III). Examples of suitable compounds include bromides, acetyl acetonates, linoleates, naphthenates and other preferably hydrocarbon dispersible compounds of the above metals. Copper and iron compounds are preferred.

The amount of metal compound used is minor to the amount of liquid polymer and is in the range of about 0.1 to 5 parts by weight per 100 parts by weight of liquid polymer and is preferably in the range of about 0.25 to 3 parts by weight.

Mixtures of inorganic basic substances and metal compounds in amounts as indicated above may also be used in this invention.

The mixture comprising (a) the liquid polymer, (b) the aziridinyl compound, and (c) the inorganic basic substance and/or metal compound, all as described above, is stable at room temperature and remains plastic for hours, that is, it does not noticeably vulcanize and can be poured and easily shaped as many as several days after mixing.

Surprisingly, the inorganic basic substance and/or metal compound, as described above, greatly increase the rate of vulcanization of the liquid polymer when an aziridinyl group containing compound is used as the vulcanizing agent; in the absence of the basic substance or metal compound the rate of vulcanization is impractically slow. This effect is unexpected, since the same inorganic basic substances or iron compounds have no influence on the rate of cure of the liquid polymer when aliphatic tertiary amines are used as vulcanizing agents. The rate of vulcanization of the liquid polymer of this invention will vary dependent on the temperature, said temperature being up to about 180° C., preferably between 60° C. and 100° C., the amount and type of vulcanizing agent and inorganic base or metal compound employed and the activity of the polymer.

Compounding ingredients, such as filters, colouring pigments, tackifiers and plasticizers also may be incorporated into the compositions of this invention. The plasticizer used must be compatible with the liquid polymer. Suitable plasticizers include paraffinic and naphthenic oils, esters, chlorinated polyphenyls, etc. The viscosity characteristics of the liquid polymers compositions can be modified, when desired, by the addition of materials such as polyethylene, polypropylene, ethylene-propylene copolymers containing more than about 80 mole percent ethylene, ethylene-vinyl acetate copolymer, trans-1,4 polyisoprene and trans-1,4 polybutadiene.

The composition of this invention, when used as a rocket propellant binder, strongly adheres to the metal casing after vulcanization and lightly binds large amounts of particulate solid components of the propellant such as the oxidizer and/or aluminum to form an elastic suspension of said solid components bonded by less than 25% by weight of total suspension of the vulcanized composition.

The following examples will further illustrate the invention. In these examples, all parts are parts by weight.

EXAMPLE I

The liquid polymer of butadiene having terminal allylic bromide groups was prepared as follows:

100 parts of butadiene and 15 parts of tetrabromomethane were emulsified in 200 parts of water containing 8.0 parts of dissolved sodium alkyl aryl sulfonate and 6.0 parts of dissolved tripotassium phosphate buffer. After raising the temperature of the system to 60° C., 3.0 parts of potassium persulfate was added to initiate the polymerization reaction. After 24 hours, 85% of the butadiene was converted to polymer. The polymer was coagulated, washed in acetone, and dried under vacuum at 90° C. 1.25 parts of methylene-bis(2-nonyl-4-methyl) phenol antioxidant were added prior to the vacuum drying step. The dried polymer was a viscous liquid having an intrinsic viscosity in toluene at 30° C. to 0.26 dl./g. and a combined bromine content of 3.35 weight percent.

5.0 parts of basic lead carbonate and 3.0 parts of methylated triethylene tetramine were added to 100 parts of the liquid polymer described above; a homogeneous compound was prepared by passing the mixture twice through a paint mill. A second compound, from which basic lead carbonate was omitted, was prepared as above. The compounds were heated for 20 minutes at 122° C. and the vulcanizates were tested for stress-strain properties. The vulcanizate properties are recorded in Table I.

TABLE I

|  | Basic lead carbonate loading (parts) | |
| --- | --- | --- |
|  | 5 | 0 |
| Property: |  |  |
| Tensile strength, kg./cm.² | 41.4 | 26.7 |
| Elongation, percent | 850 | 560 |
| 100% modulus, kg./cm.² | 9.2 | 10.8 |
| 300% modulus, kg./cm.² | 14.4 | 15.7 |

The results show that the presence of basic lead carbonate is not required in the vulcanization of the liquid polymer with a nonaziridinyl amine.

EXAMPLE II

A series of compounds was prepared; in each 3.0 parts of tri(2-methyl-1-aziridinyl)phosphine oxide and a varying amount of basic lead carbonate were used with 100 parts of the liquid polymer of Example I. The compounds were heated for 60 minutes at 165° C.; their properties are presented in Table II.

TABLE II

|  | Basic lead carbonate loading (parts) | | | |
| --- | --- | --- | --- | --- |
|  | 0 | 2 | 5 | 10 |
| Property: |  |  |  |  |
| Tensile strength, kg./cm.² | (¹) | 12.3 | 11.3 | 12.6 |
| Elongation, percent | (¹) | 730 | 270 | 160 |
| 100% modulus, kg./cm.² | (¹) | 1.4 | 5.4 | 6.5 |
| 300% modulus, kg./cm.² | (¹) | 2.4 | | |
| Solubility in benzene, percent | 100 | 37 | 11 | 10 |

¹ The compound was vulcanized as indicated by its 100% solubility in benzene.

The results show that the presence of basic lead carbonate permits vulcanization of the liquid polymer with the aziridinyl compound under practical curing conditions.

EXAMPLE III

The procedure of Example II was repeated except other inorganic basic substances were used. The vulcanizate properties are recorded in Table III.

TABLE III

| Inorganic basic substance | Basic lead phosphite | Magnesium oxide | Calcium oxide | Calcium hydroxide | Lithium hydroxide |
| --- | --- | --- | --- | --- | --- |
| Amount, parts | 5 | 5 | 5 | 5 | 2 |
| Tensile strength, kg./cm.² | 13.6 | 14.2 | 8.1 | 13.7 | 10.8 |
| Elongation, percent | 310 | 310 | 620 | 260 | 260 |
| 100% modulus, kg./cm.² | 5.7 | 6.3 | 1.5 | 7.4 | 6.3 |
| 300% modulus, kg./cm.² | 12.1 | 13.1 | 2.5 |  |  |

The results show that the presence of other inorganic basic substances permits vulcanization of the liquid polymer with aziridinyl compounds.

EXAMPLE IV

A procedure similar to that of Example II was used, except that 5.0 parts of basic carbonate and varying amounts of tri(2-methyl-1-aziridinyl)phosphine oxide were used. The vulcanizate properties are presented in Table IV.

TABLE IV

|  | Tri(2-methyl-1-aziridinyl)-phosphine oxide loading (parts) | | | |
| --- | --- | --- | --- | --- |
|  | 2.5 | 3.0 | 3.5 | 3.75 |
| Property: |  |  |  |  |
| Tensile strength, kg./cm.² | 13.2 | 13.6 | 13.0 | 13.6 |
| Elongation, percent | 420 | 370 | 300 | 250 |
| 100% modulus, kg./cm.² | 3.5 | 4.2 | 5.8 | 6.9 |
| 300% modulus, kg./cm.² | 7.7 | 9.6 | 13.7 |  |

The results show that increasing amounts of aziridinyl compounds increase the state of cure of the liquid polymer, as indicated by an increase in modulus and a decrease in elongation.

EXAMPLE V

The procedure of Example II was followed in the preparation and testing of the following compounds in which the amount and type of the aziridinyl compound was varied. The compounding recipe and test results are shown in Table V.

TABLE V

| | Compound | | | | |
|---|---|---|---|---|---|
| | A | B | C | D | E |
| Ingredient (parts): | | | | | |
| Basic lead carbonate | 5 | 5 | 5 | 5 | 5 |
| Tri(2-methyl-1-aziridinyl)phosphine oxide | | | 1.55 | 1.4 | |
| 2,2,4,4,6,6-hexa(2-methyl-1-aziridinyl)2,4,6-triphospha-1,3,5-triazine | 3.4 | | 2.55 | | 2.3 |
| Phenyl bis(2-methyl-1-aziridinyl)phosphine oxide | | 5 | | 1.6 | 1.1 |
| Property: | | | | | |
| Tensile strength, kg./cm.$^2$ | 16.5 | 13.4 | 22.8 | 11.0 | 16.8 |
| Elongation, percent | 250 | 340 | 260 | 320 | 270 |
| 100% modulus, kg./cm.$^2$ | 8.2 | 5.4 | 10.7 | 4.7 | 8.0 |
| 300% modulus, kg./cm.$^2$ | | 11.3 | | 10.0 | |

The results show that the liquid butadiene polymer having allylic bromide groups vulcanize with aziridinyl compounds in the presence of basic lead carbonate. The results also show that mixtures of different aziridinyl compounds may be used.

Two control compounds were additionally prepared and tested using the same procedure; they corresponded to compounds A and B, respectively, except for the basic lead carbonate which was omitted. Upon curing for 20 minutes at 165° C., these compounds showed a tensile strength under 6.1 kg./cm.$^2$ and a solubility in benzene of 70% and 50%, respectively, indicating that the aziridinyl compounds alone do not cure the liquid under practical curing conditions.

EXAMPLE VI

The procedure of Example II was followed except that varying amounts of aziridinyl compound, inorganic basic substances and iron compounds were used. To facilitate mixing ferric acetyl acetonate was added at a 50/50 suspension in a paraffinic oil. The liquid polymer used was similar to that of Example I except that 20 parts of tetrabromomethane were used in its preparation and the polymer had an intrinsic viscosity in toluene of 0.22 dl./g. at 30° C. The results for this series of compounds, which were heated for 20 minutes at 160° C., are presented in Table VI.

TABLE VI

| | Compound | | | |
|---|---|---|---|---|
| | A | B | C | D |
| Ingredient (parts): | | | | |
| Tri(2-methyl-1-aziridinyl) phosphine oxide | 5 | 5 | 5 | 4 |
| Ferric acetyl acetonate | 0.5 | 0.5 | | 3 |
| Iron linoleate | | | 0.25 | |
| Basic lead carbonate | | 5 | 2.5 | |
| Paraffinic oil | 0.5 | 0.5 | | 3 |
| Property: | | | | |
| Tensile strength, kg./cm.$^2$ | 8.6 | 13.8 | 12.6 | 11.6 |
| Elongation, percent | 530 | 290 | 570 | 500 |
| 100% modulus, kg./cm.$^2$ | 2.3 | 5.5 | 2.1 | 2.2 |
| 300% modulus, kg./cm.$^2$ | 4.3 | | 4.2 | 4.9 |

The results show that the presence of an iron compound permits vulcanization of the liquid polymer with the aziridinyl compound under practical curing conditions.

EXAMPLE VII

A homogeneous mixture was prepared by hand at room temperature, consisting of 2.0 parts of basic lead carbonate, 4.0 parts of tri(2-methyl-1-aziridinyl)phosphine oxide, 100 parts of the liquid polymer of Example I and 400 parts of ammonium perchlorate.

The mixture was placed inside a sealed container, which had been flushed with nitrogen, and heated at 60° C. After 10 days a dry, elastic vulcanizate was obtained in which ammonium perchlorate was homogeneously distributed and firmly held.

A similar result was obtained with a mixture consisting of 2.5 parts of basic lead carbonate, 5.0 parts of tri(2-methyl-1-aziridinyl)phosphine oxide, 0.5 part of ferric acetyl acetonate, 0.5 part of toluene, 100 parts of the liquid polymer of Example I and 434 parts of ammonium perchlorate.

The conditions of vulcanizing at moderate temperatures under nitrogen in the presence of ammonium perchlorate simulate the conditions under which rocket propellant binders are vulcanized. The results show that mixtures of the brominated liquid polymer and aziridinyl containing compounds are plastic and stable but vulcanize at 60° C. as required for use as a rocket propellant binder.

EXAMPLE VIII

The liquid polymer of Example I was mixed with tri(2-methyl-1-aziridinyl)phosphine oxide (MAPO) and acetyl acetonates of divalent metals other than iron. The components, shown in the table below, were thoroughly mixed with a mechanical stirrer and then passed through a paint mill three times. The resulting homogeneous compounds were cured in closed poly(tetrafluoroethylene) moulds at temperatures of 70° C. and 80° C., respectively, for time periods ranging from 18 hours to 71 hours. The vulcanizates were tested for stress-strain properties and the results are presented in Table VIII.

TABLE VIII

| Compound | 1 | 2 | 3 |
|---|---|---|---|
| Liquid polymer, grams | 50 | 50 | 50 |
| MAPO, grams | 4.0 | 3.0 | 3.0 |
| Cu (II) acetyl acetonate, grams | 0.15 | 0.15 | |
| Ni (II) acetyl acetonate, grams | | | 0.15 |
| Antioxidant,[1] grams | 0.75 | 0.75 | 0.75 |
| Curing temperature, °C | 80 | 70 | 80 |
| Cure time, hours | 18 | 27 | 38 |
| Tensile strength, kg./cm.$^2$ | 5.1 | 3.5 | 3.1 |
| Elongation, percent | 400 | 930 | 550 |
| Cure time, hours | 41 | 71 | 62 |
| Tensile strength, kg./cm.$^2$ | 7.7 | 4.0 | 5.9 |
| Elongation, percent | 500 | 420 | 610 |

[1] Methylene-bis(2-nonyl-4-methyl)phenol.

What is claimed is:

1. A vulcanizable composition comprising a mixture of (a) 100 parts by weight of a liquid polymer of a $C_4$–$C_8$ diolefinic hydrocarbon in which polymer a major proportion of the molecules have two terminal allylic bromide groups, (b) from 0.05 to 15 parts by weight of an aziridinyl compound of from 2 to 6 aziridinyl groups and (c) from 0.5 to 15 parts by weight of a basic substance selected from oxides, hydroxides, carbonates, silicates, sulfates, phosphites and organic acid salts of a metal selected from alkaline earth metals, alkali metals and lead, a metal compound selected from bromides, acetyl acetonates, lineoleates and naphthenates of a metal selected from copper, iron, nickel and cobalt, or a mixture of said basic substance and said metal compound.

2. The vulcanizable composition according to claim 1 in which the aziridinyl compound is selected from the group consisting of phenyl bis(2-methyl-1-aziridinyl) phosphine oxide, 2,4,6-tri(1-aziridinyl) 1,3,5-triazine, tri(2-methyl-1-aziridinyl)phosphineoxide, 2,2,4,4,6,6-hexa(2-methyl-1-aziridinyl)2,4,6-triphospha-1,3,5-triazine and 2,4,6-tri(2-methyl-1-aziridinyl)1,3,5-triazine and mixtures thereof.

3. The vulcanizable composition according to claim 1 in which basic substance is selected from the group consisting of magnesium oxide, basic lead carbonate, basic lead phosphite, calcium hydroxide and lithium hydroxide.

4. The vulcanizable composition according to claim 1 in which the metal compound is used in an amount of 0.1 to about 5 parts by weight per 100 parts by weight of liquid polymer.

5. The vulcanizable composition according to claim 4 in which the metal compound is a copper (II) compound.

6. The vulcanizable composition according to claim 4 in which the metal compound is selected from iron linoleate and iron acetyl acetonate.

7. A process of vulcanizing a liquid polymer of a $C_4$-$C_8$ diolefinic hydrocarbon in which polymer a major proportion of the molecules have two terminal allylic bromide groups which comprises (I) mixing 100 parts by weight of said liquid polymer with 0.05 to 15 parts by weight of a compound containing from 2 to 6 aziridinyl groups and 0.5 to 15 parts by weight of a basic substance selected from oxides, hydroxides, carbonates, silicates, sulfates, phosphites and organic acid salts of a metal selected from alkaline earth metals, alkali metals and lead, a metal compound selected from bromides, acetyl acetonates, linoleates and naphthenates of a metal selected from copper, iron, nickel and cobalt, or a mixture of said basic substance and said metal compound, to produce a plastic mixture having improved stability at room temperature, and (II) reacting said mixture at a temperature of at least 50° C. to produce a substantially insoluble vulcanized composition.

8. The process of vulcanizing according to claim 7 in which the plastic mixture is mixed with particulate solid material to prepare a suspension of said solid material suspended in less than 25% by weight based on total suspension of said plastic mixture, and said plastic mixture in said suspension is reacted at a temperature between 60° C. and 100° C. to produce an elastic suspension of said solid material bonded by a substantially insoluble vulcanized composition.

References Cited

UNITED STATES PATENTS

| | | | |
|---|---|---|---|
| 2,518,573 | 8/1950 | Scott | 260—92.3 |
| 3,135,716 | 5/1964 | Uraneck et al. | 260—45.5 |
| 3,150,206 | 9/1964 | Short et al. | 260—894 |
| 3,261,818 | 7/1966 | Marcantonio | 260—85.1 |

JOSEPH L. SCHOFER, Primary Examiner

W. F. HAMROCK, Assistant Examiner

U.S. Cl. X.R.

260—94.7, 795, 798, 654, 85.1, 83.3, 86.7, 41.5, 92.3; 44—25